United States Patent
Fiterman et al.

(10) Patent No.: US 9,507,706 B2
(45) Date of Patent: Nov. 29, 2016

(54) MEMORY SYSTEM CONTROLLER INCLUDING A MULTI-RESOLUTION INTERNAL CACHE

(71) Applicant: SanDisk Technologies Inc., Plano, TX (US)

(72) Inventors: Mark Fiterman, Beer-Sheva (IL); Yoav Weinberg, Thornhill (CA); Itai Dror, Omer (IL)

(73) Assignee: SanDisk Technologies LLC, Plano, TX (US)

( * ) Notice: Subject to any disclaimer, the term of this patent is extended or adjusted under 35 U.S.C. 154(b) by 230 days.

(21) Appl. No.: 14/095,294

(22) Filed: Dec. 3, 2013

(65) Prior Publication Data

US 2015/0154109 A1 Jun. 4, 2015

(51) Int. Cl.
*G06F 12/02* (2006.01)
*G06F 12/08* (2016.01)

(52) U.S. Cl.
CPC ....... *G06F 12/0246* (2013.01); *G06F 12/0868* (2013.01); *G06F 12/0886* (2013.01); *G06F 12/0895* (2013.01); *G06F 2212/7208* (2013.01)

(58) Field of Classification Search
None
See application file for complete search history.

(56) References Cited

U.S. PATENT DOCUMENTS

| | | | |
|---|---|---|---|
| 2005/0193175 A1 | 9/2005 | Morrow | |
| 2009/0083478 A1* | 3/2009 | Kunimatsu | G06F 12/0246 711/103 |
| 2009/0132770 A1* | 5/2009 | Lin | G06F 12/0804 711/154 |
| 2010/0185816 A1* | 7/2010 | Sauber | G06F 12/0886 711/122 |
| 2012/0030412 A1* | 2/2012 | Dhakshinamurthy | G11C 11/5628 711/103 |

OTHER PUBLICATIONS

International Search Report and Written Opinion for PCT Application No. PCT/US2014/068114, dated Mar. 23, 2014, 7 pages.

* cited by examiner

*Primary Examiner* — Denise Tran
(74) *Attorney, Agent, or Firm* — Brinks Gilson & Lione

(57) ABSTRACT

A memory system comprising a non-volatile memory and a controller in communication with the non-volatile memory is disclosed. The controller may include a central processing unit ("CPU") and an internal cache in communication with the CPU via a plurality of cache lines. The CPU is configured to utilize a first subset of the plurality of cache lines when accessing data stored in the internal cache at a first resolution. Additionally, the CPU is configured to utilize a second subset of the plurality of cache lines when accessing data stored in the internal case at a second resolution, where the first and second resolutions are different resolutions.

13 Claims, 8 Drawing Sheets

MEMORY SYSTEM CONTROLLER INCLUDING A MULTI-RESOLUTION INTERNAL CACHE

BACKGROUND

Controllers of memory systems often utilize multiple caches, some of which are internal to the controller and some of which are external to the controller. For example in many implementations, controllers of memory systems utilize one internal cache that is internal to the controller and one external DRAM cache that is external to the controller.

The internal cache allows the controller to cache data such as central processing unit variables that flow between the external DRAM cache and the controller. In addition to storing data for the controller, the external DRAM cache also provides for the caching of data as data flows between a host that is coupled with the memory system and a non-volatile memory of the memory system.

The internal cache that is internal to the controller is often significantly faster than the external DRAM cache and may be accessed at finer resolutions than the external DRAM cache. However, the size of the internal cache is often significantly smaller than the external DRAM cache. For example, a size of an internal cache is often on the order of 128 Kilobits, where a size of an external cache is often on the order of 512 Megabits.

Improved memory systems are desirable that are able to provide controllers with a cache that provides the speed and fine resolution of an internal cache while also providing the size and coarse resolution of an external DRAM cache.

SUMMARY

The present disclosure is directed to a memory system controller that includes a multi-resolution internal cache. In one aspect, a memory system is disclosed. The memory system comprises a non-volatile memory and a controller in communication with the non-volatile memory. The controller comprises a central processing unit and an internal cache in communication with the central processing unit via a plurality of cache lines.

The central processing unit is configured to utilize a first subset of the plurality of cache lines when accessing data that is stored in the internal cache at a first resolution. Additionally, the central processing unit is configured to utilize a second subset of the plurality of cache lines when accessing data that is stored in the internal cache at a second resolution, where the first resolution and the second resolution are different resolutions.

In another aspect, a method is disclosed. The element of the method are performed in a controller of a memory system, where the controller comprises a central processing unit and an internal cache that is in communication with the central processing unit via a plurality of cache lines.

The central processing unit determines whether to access data stored in the internal cache using a first subset of the plurality cache lines or a second subset of the plurality of cache lines based on a determined need to access data stored in the internal cache at a first resolution or a second resolution that is different from the first resolution.

The central processing unit accesses data stored in the internal cache utilizing the first subset of the plurality of cache lines in response to a determination to access data stored in the internal cache at the first resolution.

The central processing unit accesses the data stored in the internal cache utilizing the second subset of the plurality of cache lines in response to a determination to access data stored in the internal cache at the second resolution.

BRIEF DESCRIPTION OF THE DRAWINGS

FIG. 2b is a diagram illustrating cache lines accessing sectors and segments of an internal cache of the memory system controller of FIG. 2a.

DETAILED DESCRIPTION OF THE DRAWINGS

The present disclosure is directed to a memory system comprising a controller that includes a multi-resolution internal cache, and methods for a central processing unit of the controller to access and utilize the multi-resolution internal cache. As discussed in more detail below, a memory system may include a non-volatile memory and a controller in communication with the non-volatile memory. The controller may include a central processing unit ("CPU") and a multi-resolution internal cache in communication with the CPU via a plurality of cache lines. In contrast to previous memory systems with controllers that utilize both an internal cache that is internal to the controller and an external cache that is external to the controller, the controllers in the present disclosure do not utilize an external cache.

When the CPU accesses data stored in the internal cache, the CPU determines a resolution at which to access the data. For example, the CPU may access firmware for the CPU stored in the internal cache at a first resolution by utilizing a first subset of the plurality of cache lines to access the internal cache. The CPU may further access CPU variables stored in the internal cache at a second resolution that is finer than the first resolution by utilizing a second subset of the plurality of cache lines to access the internal cache. By utilizing a controller in a memory system that includes a multi-resolution cache rather than an internal cache and an external cache, the controller is able to improve overall performance within the controller by utilizing fast access to date regardless of whether the controller is reading a small amount of data or a large amount of data from the internal cache; reducing latency when reading a large amount of data from the internal cache; and reducing redundancy in storage in comparison to traditional controllers.

A flash memory system suitable for use in implementing aspects of the invention is shown in FIGS. 1-6. A host system 100 of FIG. 1 stores data into and retrieves data from a memory system 102. The memory system may be flash memory embedded within the host, such as in the form of a solid state disk (SSD) drive installed in a personal computer.

Figure 1:
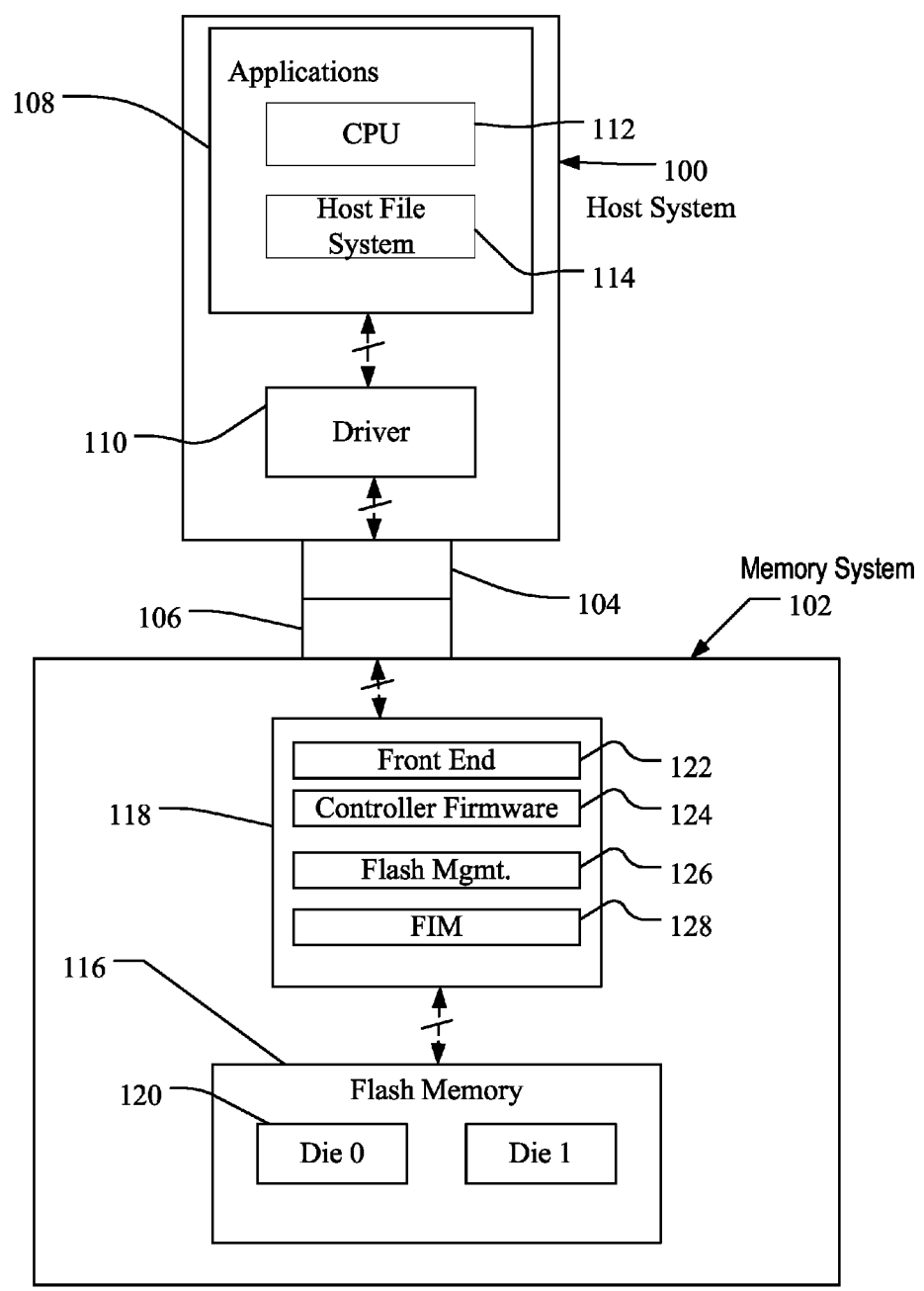
FIG. 1 illustrates a host connected with a memory system having a multi-bank non-volatile memory containing multiple die.

Alternatively, the memory system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host. SSD drives may be in the form of discrete modules that are drop-in replacements for rotating magnetic disk drives.

The host system 100 of FIG. 1 may be viewed as having two major parts, in so far as the memory system 102 is concerned, made up of a combination of circuitry and software. They are an applications portion 108 and a driver portion 110 that interface with the memory system 102. In a PC, for example, the applications portion 108 can include a processor 112 running word processing, graphics, control or other popular application software, as well as the file system 114 for managing data on the host 100. In a camera, cellular telephone or other host system that is primarily dedicated to perform a single set of functions, the applications portion 108 includes the software that operates the camera to take and store pictures, the cellular telephone to make and receive calls, and the like.

The memory system 102 of FIG. 1 may include non-volatile memory, such as flash memory 116 and a system controller 118 that both interfaces with the host 100 to which the memory system 102 is connected for passing data back and forth and controls the flash memory 116. The system controller 118 may convert between logical addresses of data used by the host 100 and physical addresses of the flash memory 116 during data programming and reading. The flash memory 116 may include any number of memory die 120 and two memory die are shown in FIG. 1 simply by way of illustration.

Functionally, the system controller 118 may include a front end 122 that interfaces with the host system, controller firmware 124 for coordinating operation of the flash memory 116, flash management logic 126 for internal memory management operations such as garbage collection, and one or more flash interface modules (FIMs) 128 to provide a communication interface between the controller with the flash memory 116.

Figure 2A:
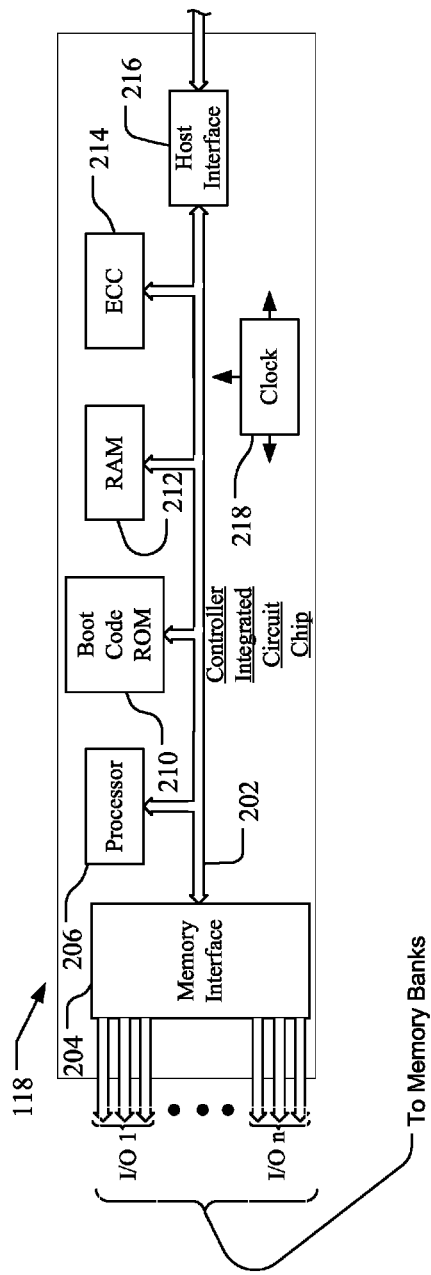
FIG. 2a is an example block diagram of an example flash memory system controller for use in the multiple die non-volatile memory of FIG. 1.

The system controller 118 may be implemented on a single integrated circuit chip, such as an application specific integrated circuit (ASIC) such as shown in FIG. 2a. The processor 206 of the system controller 118 may be configured as a multi-thread processor capable of communicating separately with each of the respective memory banks 120 via a memory interface 204 having I/O ports for each of the respective banks 120 in the flash memory 116. The system controller 118 may include an internal clock 218. The processor 206 communicates with an error correction code (ECC) module 214, an internal cache 212, a host interface 216, and boot code ROM 210 via an internal data bus 202.

In some implementations, the internal cache 212 may be a DRAM cache and the processor 206 may communicate with the internal cache 212 over the internal data bus 202 via a plurality of cache lines. In some implementations, the internal cache 212 may be divided into a plurality of sectors, where at least one cache line of the plurality of cache lines is associated with each sector. Utilizing a cache line associated with a sector, the processor 206 may access and read the data stored at that particular sector.

When the internal cache 212 supports multiple resolutions, the processor 206 may access different portions of a sector (also known as segments of the sector) by reading different portions of data stored along the cache line associated with that sector. For example, the processor 206 may read all the data stored in the sector by reading all the data along the cache line. In some implementations this may be known as reading data at a course resolution. Alternatively, the processor 206 may read only a portion of the data stored in the same sector by only reading data along one or more portion of the same cache line. In some implementations this may be known as reading data at a fine resolution.

It will be appreciated that the processor 206 may utilize different subsets of the plurality of cache lines to read data stored in one or more sectors of the internal cache 212 at different resolutions. While the example above may only describe a course resolution and a fine resolution, the internal cache 212 may be designed to support any number of resolutions.

Figure 2B:
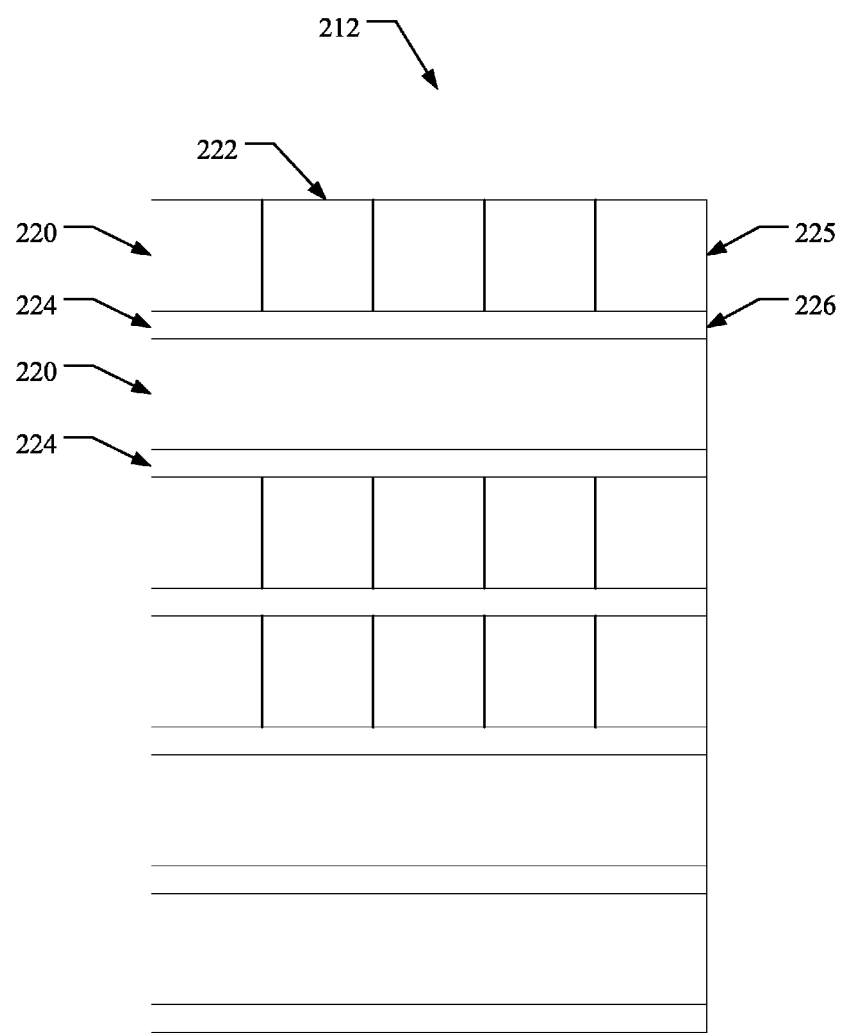

FIG. 2b is a diagram illustrating a portion of one implementation of an internal cache 212 as described above. The internal cache 212 is divided into a plurality of sectors 220, with one or more of the sectors 220 further divided into a plurality of segments 222. A plurality of cache lines 224 access the plurality of sectors 220 and the plurality of segments 222 within the plurality of sectors 220.

For example, a first cache line 226 of the plurality of cache lines 224 may access a first sector 225 of the plurality of sectors 220 and the plurality of segments associated with the first sector 225. The processor 206 from FIG. 2a may read all the data stored in the first sector 225 at a course resolution by reading all the data along the first cache line 226. By the same principle, the processor may quickly read all the data stored in multiple sectors at a course resolution by reading all the data along a subset of the plurality of cache lines 224 that are associated with the multiple sectors.

With respect to reading data at a finer resolution, the processor 206 from FIG. 2a may read only a portion of the data stored in the first sector 225 by reading data along one or more portions of the first cache line 226 to access data stored in specific segments. By the same principle, the processor may quickly read all the data in multiple segments by reading data along one or more portions of one or more of the plurality of cache lines 224.

Figure 3:
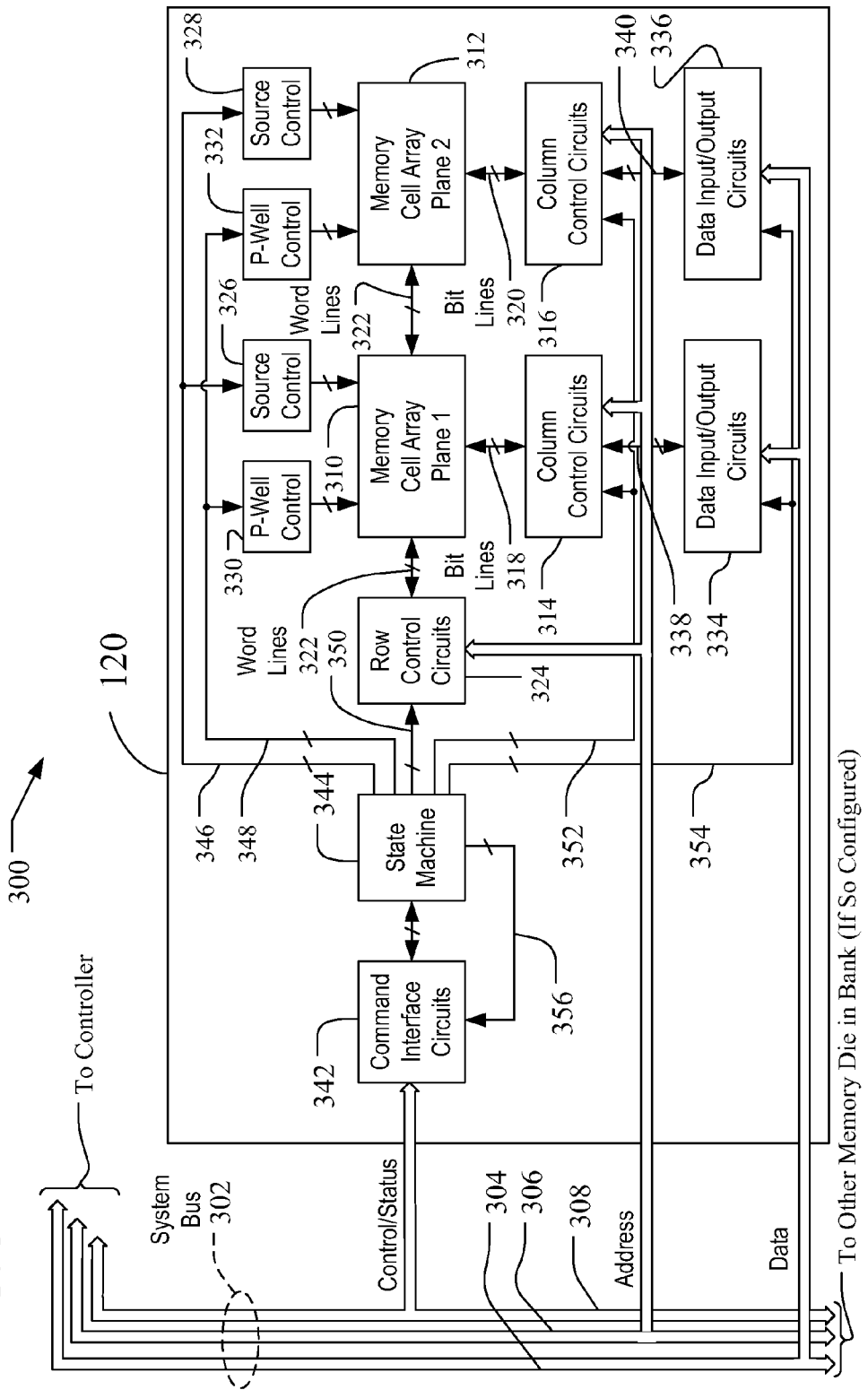
FIG. 3 is an example flash memory bank suitable as one of the non-volatile memory banks illustrated in FIG. 1.

Referring again to FIG. 1, each die 120 in the flash memory 116 may contain an array of memory cells organized into multiple planes. FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 306. Source voltage control circuits 326 and 328 are also connected with the respective planes, as are p-well voltage control circuits 330 and 332. If the bank 300 is in the form of a memory chip with a single array of memory cells, and if two or more such chips exist in the system, data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each bank 120 to program data, read data, erase and attend to various housekeeping matters, each memory chip also contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 302.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4*a* for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4A:
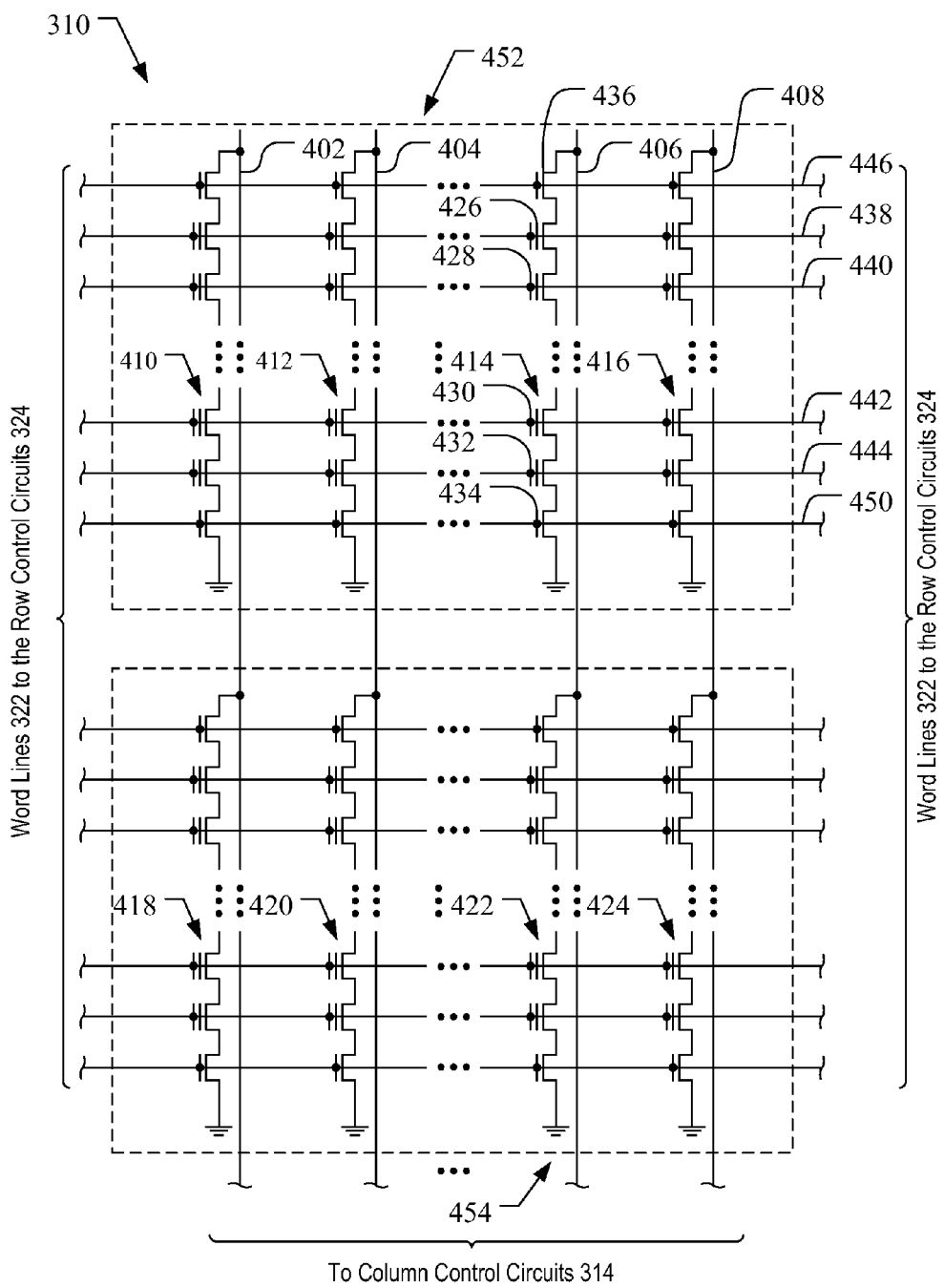
FIG. 4a is a representative circuit diagram of a memory cell array that may be used in the memory bank of FIG. 3.

Word lines 438-444 of FIG. 4*a* individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. However, in other implementations, the rows of a NAND array are not programmed in sequential order.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory. For example, binary flash memory may be used for caching data and MLC memory may be used for longer term storage. The charge storage elements of the memory cells are most commonly conductive floating gates but may alternatively be non-conductive dielectric charge trapping material.

In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Figure 4B:
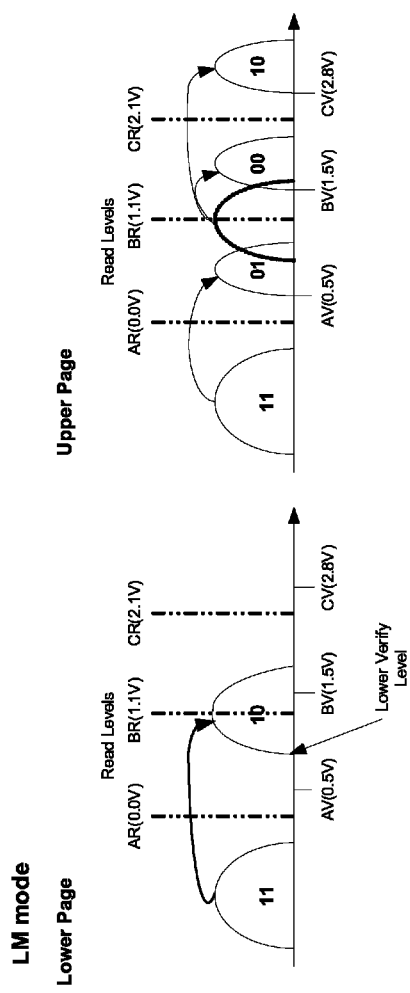
FIG. 4b illustrates charge levels in a MLC memory operated to store two bits of data in a memory cell.

FIG. 4*b* illustrates one implementation of the four charge levels used to represent two bits of data in a memory cell. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page.

For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

Figure 5:
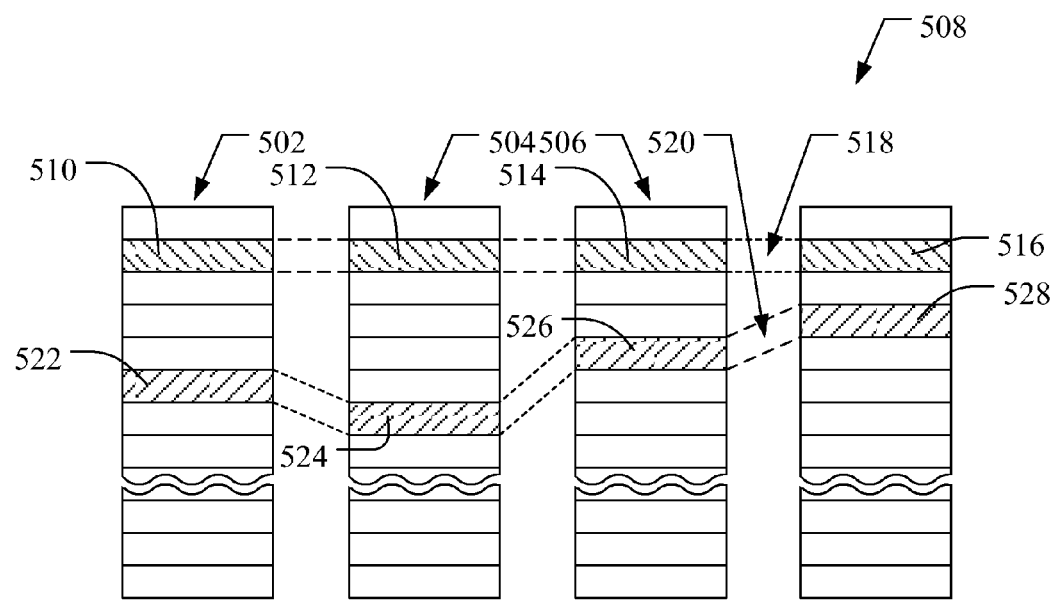
FIG. 5 illustrates an example physical memory organization of the memory bank of FIG. 3.

FIG. 5 conceptually illustrates a multiple plane arrangement showing four planes 502-508 of memory cells. These planes 502-508 may be on a single die, on two die (two of the planes on each die) or on four separate die. Of course, other numbers of planes, such as 1, 2, 8, 16 or more may exist in each die of a system. The planes are individually divided into blocks of memory cells shown in FIG. 5 by rectangles, such as blocks 510, 512, 514 and 516, located in respective planes 502-508. There can be dozens or hundreds of blocks in each plane.

As mentioned above, a block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 6:
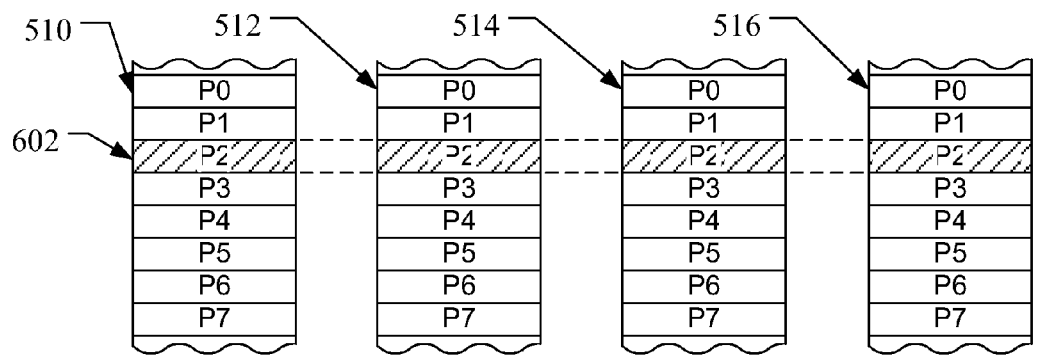
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 32, 64 or more pages of memory cells within each block. The page is the unit of data programming and reading within a block, containing the minimum amount of data that are programmed or read at one time. In the NAND architecture of FIG. 3, a page is formed of memory cells along a word line within a block. However, in order to increase the memory system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks.

The flash management layer in the controller firmware of the memory card may choose to allocate memory in terms of allocation units called logical groups. Writes that are less than a logical group size will result in the controller copying valid data stored at an original physical location to a new physical location in addition to the controller writing incoming data. This overhead decreases performance and endurance of the memory. In order to minimize this overhead, a group of memory is used as update blocks. An update block is usually a memory of better endurance than the data blocks. i.e, if the data blocks have MLC memory, the update blocks have SLC memory. Writes that are less than a logical group may result in the controller directing data into the update blocks, and after consolidation, the controller may copy data at a later point in time from the update block to one or more program data blocks. The controller performs these actions based on the fact that the update blocks are more durable and there is more possibility of collecting the entire logical group of data in the update blocks before writing into the data blocks, thus reducing overhead in the MLC memory. It is also more desirable to retain frequently written data blocks in the update block for similar reasons.

As stated above, memory systems may include a controller that utilizes a multi-resolution internal cache to allow a CPU of the controller to more efficiently access differently types of data stored in the internal cache. Generally, the controller is in communication with the internal cache via a plurality of cache lines such that the controller is able to utilize differently subsets of the plurality of cache lines to access data stored at the internal cache at different resolutions. Those of skill in the art will appreciate that providing the CPU the ability to access the internal cache at different resolutions provides the CPU the ability to access data stored at the internal cache at differently levels of granularity.

In one implementation, for example, the internal cache may be configured to support two resolutions. However, in other implementations, the internal cache may be configured to support any number of resolutions.

Continuing with the example where the internal cache is configured to support two resolutions, the internal cache may support a first resolution that is a coarse resolution, such as four kilobytes (4 KB), and the internal cache may support a second resolution that is a fine resolution, as 64 bytes. The CPU may determine a need to access data stored in the internal cache at the coarse resolution when accessing a large group of data at one time such as firmware or data received from a host device prior to storage in the non-volatile memory, for example. Alternatively, the CPU may determine a need to access data stored in the internal cache at a finer resolution when accessing a small group of data such as CPU variables, a subset of data normally accessed at the coarse resolution, or when accessing a look-up table, for example.

As explained in more detail below, prior to accessing the internal cache of the controller, the CPU of the controller determines what resolution to access the internal cache at based on factors such as a type of data to be read from the internal cache; an amount of data, such as a number of bytes, to be read from the internal cache; an amount over overhead to the memory system in accessing data stored in the internal cache; or any other factor that may indicate to the CPU whether to access data stored in the internal cache at a coarse resolution or a fine resolution. Based on the determined resolution, the CPU then determines a subset of the plurality of cache lines to access data stored at the internal cache.

Continuing with the example above where the internal cache supports two resolutions, prior to the CPU accessing the internal cache, the CPU determines whether to access data stored at the internal cache at a coarse resolution or at a fine resolution. In response to a determination to access the internal cache at the coarse resolution, the CPU utilizes a first subset of the plurality of cache lines to access data stored in the internal cache. Alternatively, in response to a determination to access the internal cache at a fine resolution, the CPU utilizes a second subset of the plurality of cache lines to access data stored in the internal cache.

Figure 7:
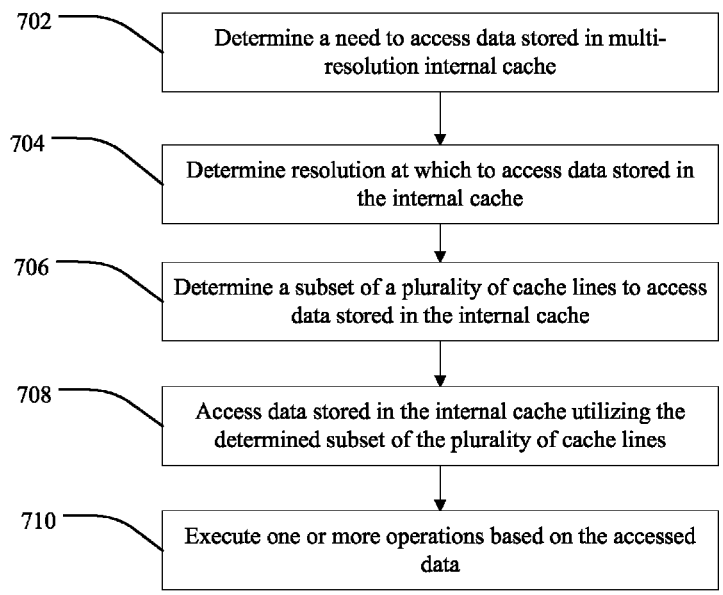
FIG. 7 is a flow chart of one method for a controller to utilize a multi-resolution internal cache.

FIG. 7 is a flow chart of one method for a controller of a memory system to utilize a multi-resolution internal cache. The elements of the method occur in a controller of a memory system comprising a CPU and an internal cache in communication with the CPU via a plurality of cache lines.

The method begins at step 702 with a CPU of a controller of the memory system determining a need to access data stored in an internal cache of the controller. The CPU may determine the need to access data based on, for example, a command from a host coupled to the memory system, a command initiating from within the memory system, a need to access firmware of the CPU for execution, or any other command that may indicate to the CPU a need to access data stored in the internal cache.

At step 704, the CPU determines a resolution at which to access the data stored in the internal cache. In some implementations, the CPU may determine a resolution at which to access data stored in the internal cache based on a type of data to be read from the internal cache; an amount of data, such as a number of bytes, to be read from the internal cache; an amount over overhead to the memory system in accessing data stored in the internal cache; or any other factor that may indicate to the CPU whether to access data stored in the internal cache at a coarse resolution or a fine resolution.

At step 706, based on the determined resolution, the CPU determines a subset of the plurality of cache lines to access data stored at the internal cache. At step 708, the CPU accesses data stored at the internal cache utilizing the determined subset of the plurality of cache lines, and at step 710, the CPU executes one or more operations based on the accessed data.

FIGS. 1-7 illustrate memory systems, and methods for utilizing memory systems, that comprise a controller that includes a multi-resolution internal cache. As explained above, a memory system may include a non-volatile memory and a controller in communication with the non-volatile memory. The controller may include a CPU and a multi-resolution internal cache in communication with the CPU via a plurality of cache lines. When the CPU accesses data stored in the internal cache, the CPU determines a resolution at which to access the data and utilizes a subset of the plurality of cache lines in order to access the data stored at the internal cache at the desired resolution.

By utilizing a controller in a memory system that includes a multi-resolution cache rather than an internal cache and an external cache, the controller is able to improve overall performance within the controller by utilizing fast access to date regardless of whether the controller is reading a small amount of data or a large amount of data from the internal cache; reducing latency when reading a large amount of data from the internal cache; and reducing redundancy in storage in comparison to traditional controllers.

It is intended that the foregoing detailed description be regarded as illustrative rather than limiting, and that it be understood that it is the following claims, including all equivalents, that are intended to define the spirit and scope of this invention.

The invention claimed is:

1. A memory system comprising:
   non-volatile memory; and
   a controller in communication with the non-volatile memory, the controller comprising:
     a central processing unit; and
     an internal cache in communication with the central processing unit via a plurality of cache lines, the internal cache configured to simultaneously store central processing unit variables, host data, and firmware for the central processing unit;
     wherein the central processing unit is configured to utilize a first subset of the plurality of cache lines when accessing a first set of data that is stored in a sector of the internal cache at a first resolution, the first set of data comprising at least on of the central processing unit variables or the host data;
     wherein the central processing unit is configured to utilize a second subset of the plurality of cache lines when accessing a second set of data that is stored in the sector of the internal cache at a second resolution, the second set of data comprising the firmware for the central processing unit; and
     wherein the second subset of the plurality of cache lines provides access to data stored in the sector of the internal cache at a finer resolution that the first subset of the plurality of cache lines provides access to data stored in the sector of the internal cache.

2. The memory system of claim 1, wherein the first subset of the plurality of cache lines provides access to the first set data stored in the sector of the internal cache at the first resolution of four kilobytes (4 KB).

3. The memory system of claim 1, wherein the second subset of the plurality of cache lines provides access to the second set of data stored in the sector of the internal cache at the second resolution of 64 bytes.

4. The memory system of claim 1, wherein the central processing unit is configured to determine whether to access data stored in the sector of the internal cache utilizing the first subset of the plurality of cache lines or the second subset of the plurality of cache lines based on a number of bytes of data that the central processing unit is accessing in the internal cache.

5. The memory system of claim 1, wherein the central processing unit is configured to determine whether to access data stored in the sector of the internal cache utilizing the first subset of the plurality of cache lines or the second subset of the plurality of cache lines based on an amount of overhead for the memory system in accessing a type of data.

6. The memory system of claim 1, wherein the controller is embedded in a host device.

7. The memory system of claim 6, wherein the non-volatile memory is positioned in a removable storage device configured to removably connect with a host.

8. The memory system of claim 1, wherein the memory system is embedded in a host device.

9. The memory system of claim 1, wherein the memory system is positioned in a removable storage device configured to removably connect with a host.

10. A method comprising:
    performing the following in a controller of a memory system, the controller comprising a central processing unit and an internal cache that is in communication with the central processing unit via a plurality of cache lines, the internal cache configured to simultaneously store central processing unit variables, host data, and firmware for the central processing unit:
      determining, with the central processing unit, whether to access data stored in a sector of the internal cache using a first subset of the plurality of cache lines or a second subset of the plurality of cache lines based on a determined need to access data stored in the internal cache at a first resolution or a second resolution that is different from the first resolution, wherein the second subset of the plurality of cache lines provides access to data stored in the sector of the internal cache at a finer resolution than the first subset of the plurality of cache lines provides access to data stored in the sector of the internal cache;
      accessing, with the central processing unit, data stored in the sector of the internal cache utilizing the first subset of the plurality of cache lines in response to a determination to access data stored in the sector internal cache at the first resolution, the data accessed at the first resolution comprising at least one of the central processing unit variables or the host data; and
      accessing, with the central processing unit, data stored in the sector of the internal cache utilizing the second subset of the plurality of cache lines in response to a determination to access data stored in the sector of the internal cache at the second resolution, the data accessed at the second resolution comprising the firmware for the central processing unit.

11. The method of claim 10, wherein the first subset of the plurality of cache lines provides access to data stored in the sector of the internal cache at the first resolution of four kilobytes (4 KB) and the second subset of the plurality of cache lines provides access to data stored in the sector of the internal cache at the second resolution of 64 bytes.

12. The method of claim 10, wherein the controller of the memory system is embedded in a host device.

13. The method of claim 10, wherein the memory system is positioned in a removable storage device configured to removably connect with a host.

* * * * *